United States Patent [19]

McConnell, Jr. et al.

[11] 4,345,997
[45] Aug. 24, 1982

[54] MEDIA

[75] Inventors: William K. McConnell, Jr., Fort Worth; Charles M. Campbell, Burleson, both of Tex.

[73] Assignee: Crane Co., New York, N.Y.

[21] Appl. No.: 241,794

[22] Filed: Mar. 9, 1981

[51] Int. Cl.³ .................................................. C02F 3/04
[52] U.S. Cl. ........................................ 210/150; 261/92
[58] Field of Search .................. 210/150, 151, 619; 261/92

[56] References Cited
U.S. PATENT DOCUMENTS 3,904,525  9/1975  Rosenberg .......................... 210/150
4,137,172  1/1979  Sako et al. .......................... 210/150
4,268,385  5/1981  Yoshikawa .......................... 210/150

FOREIGN PATENT DOCUMENTS 2554757  7/1976  Fed. Rep. of Germany ...... 210/150
 132191  9/1978  Fed. Rep. of Germany ...... 210/150

Primary Examiner—Benoît Castel
Attorney, Agent, or Firm—George S. Schwind

[57] ABSTRACT

A contactor media for removing waste from water comprising at least two mated discs. Each disc having parallel raised ribs separated by parallel inverted ribs in an alternating rib-inverted rib pattern. Every rib and inverted rib has a series of uniformly spaced apart recesses with the recesses of the ribs located on the side of the disc opposite the recesses of the inverted ribs. The mated discs have the recesses of the inverted ribs of one disc interfitted with the recesses of the ribs of the other disc, and the two mated discs form crossing chordal channels for the flow of waste water therein and the deposit of waste on the surfaces thereof.

8 Claims, 9 Drawing Figures

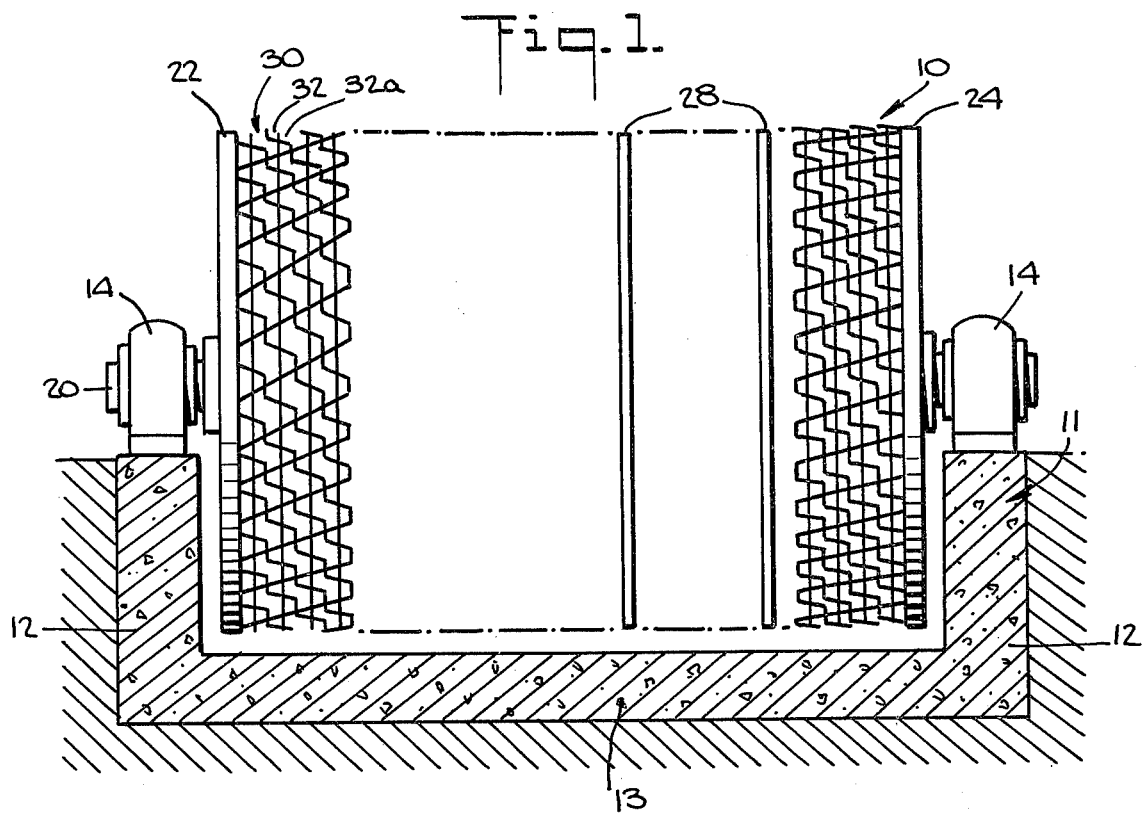
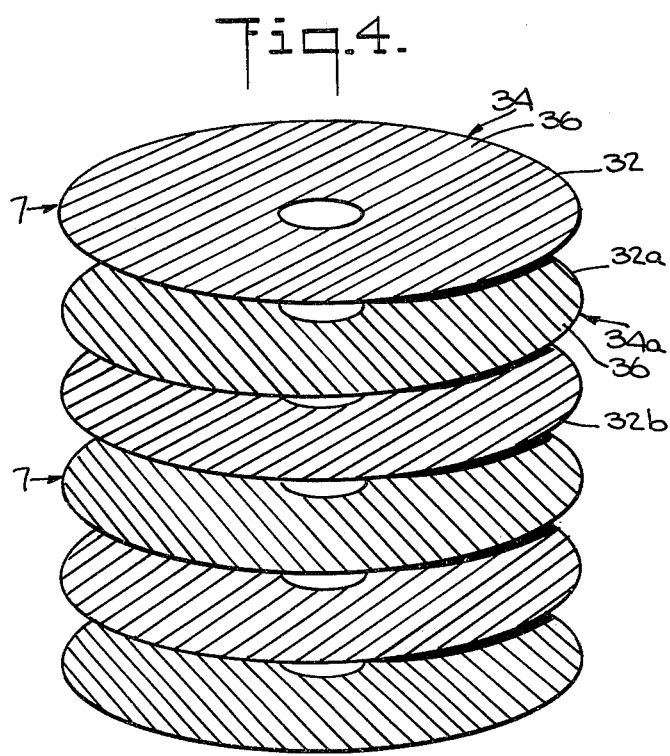

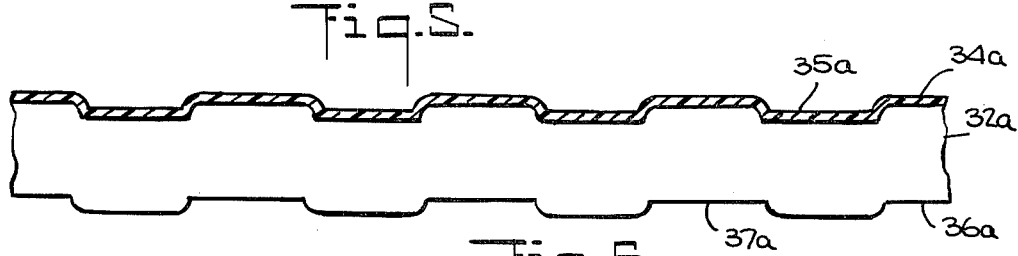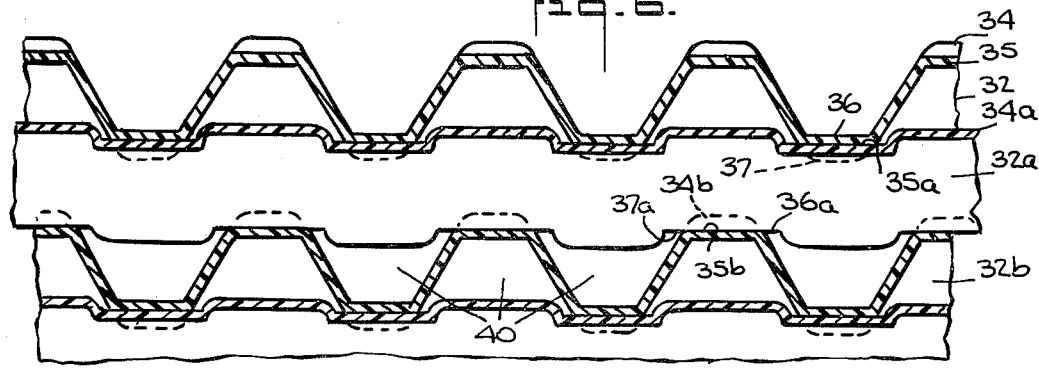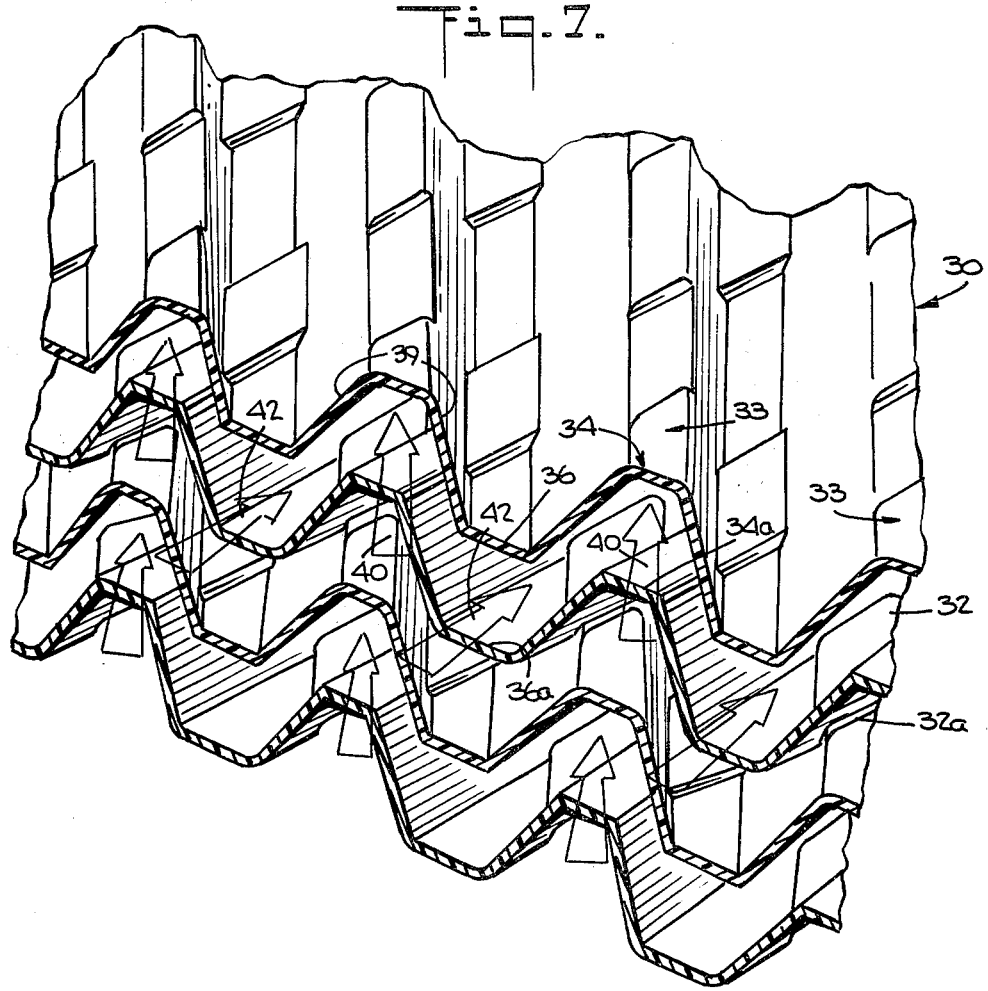

MEDIA

This invention relates to biological purification of waste water by the use of rotating contactors, and in particular to an improved contactor media.

BACKGROUND OF THE INVENTION

The biological treatment of waste water involves the use of rotating contactor media which provides surfaces for the deposit of waste or biological slimes thereon. The media is positioned in a water treatment tank so that approximately its lower half is immersed in a body of waste water, while its upper half is exposed to the atmosphere. As the media rotates, its halves are alternatively exposed to the waste water and to oxygen in the atmosphere causing the deposit of slime on its surface. Prior art patents recognize the importance of media designs which employ a plurality of discs to enhance surface area. Such designs have adjacent discs interconnected by gluing or welding.

SUMMARY OF THE INVENTION

It is an object of this invention to provide a media having heretofore increased permeability.

It is another object of this invention to provide a media having adjacent discs which interfit with one another.

It is still another object of this invention to provide a media which is strong and stable but relatively inexpensive.

These and other objects of this invention are provided for by a contactor media for removing waste from water comprising at least two mated discs. Each disc has parallel raised ribs separated by parallel inverted ribs in an alternating single rib-single inverted rib pattern. Every rib and inverted rib has a series of uniformly spaced apart recesses with the recesses of the ribs located on the side of the disc opposite the recesses of the inverted ribs. Two mated discs have the recesses of the inverted ribs of one disc interfitted with the recesses of the ribs of the other disc, and the two mated discs form crossing chordal channels for the flow of waste water therein and the deposit of waste on the surfaces thereof.

BRIEF DESCRIPTION OF THE DRAWINGS

FIG. 1 is a cross-sectional view showing a plurality of mated discs mounted in operative condition in the tank.

FIG. 4 is a schematic view of a plurality of mated discs of FIG. 1.

FIG. 5 is a sectional view taken at 5—5 of FIG. 2 showing only one disc.

FIG. 6 is a sectional view taken at 6—6 of FIG. 2 showing a plurality of mated discs.

FIG. 7 is a perspective view in section taken at 7—7 of FIG. 4.

FIG. 8 is a schematic view of semi-circular segments of the discs of FIG. 4 with holding pins therethrough.

FIG. 9 is a schematic view of a pie segment of FIG. 8 showing receiving holes for the pins.

DESCRIPTION OF THE PREFERRED EMBODIMENTS

Figure 2:
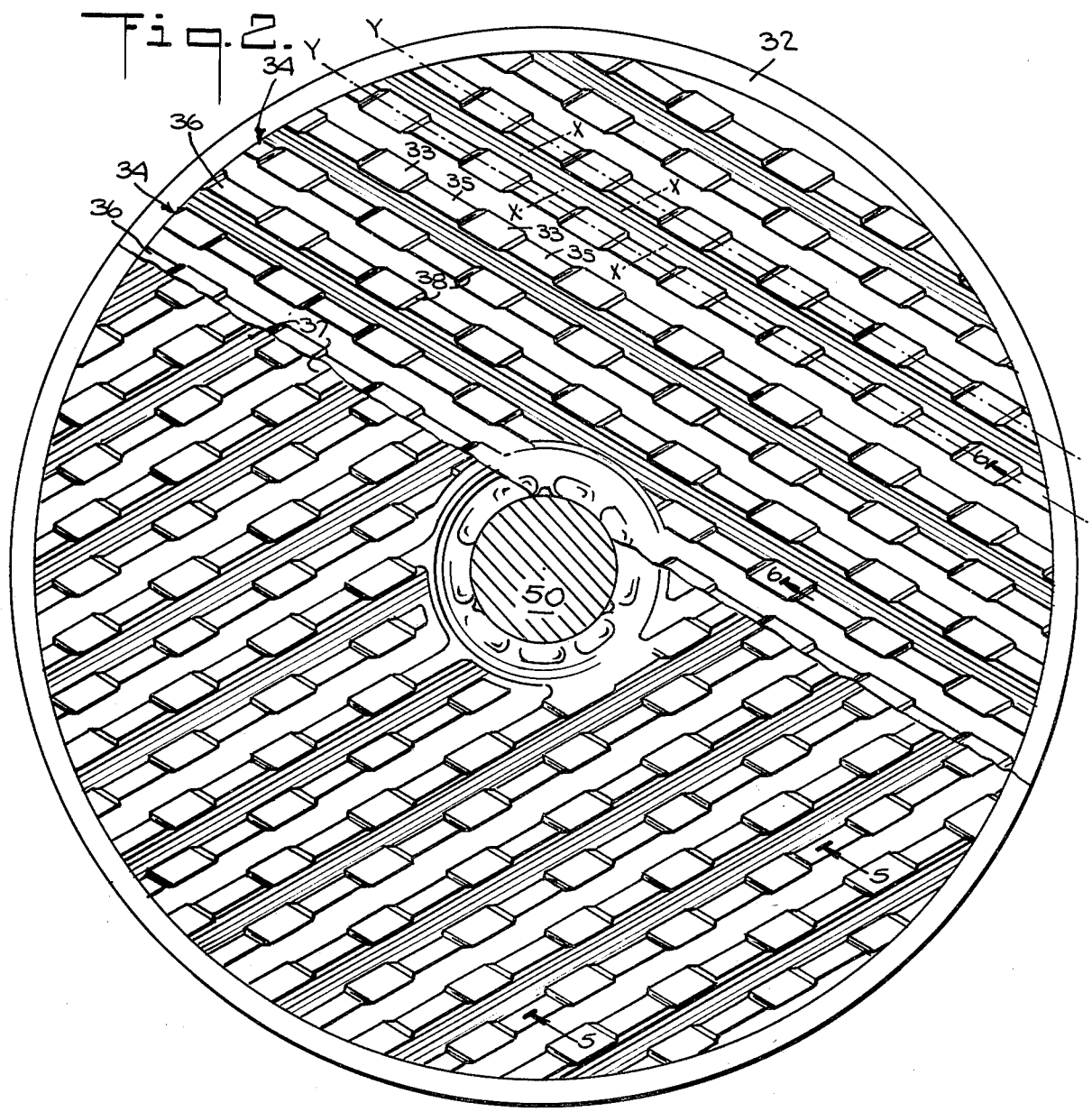
FIG. 2 is an elevation view in section of two mated discs.

Referring to the drawings and in particular to FIG. 1, a water treatment apparatus, generally represented by reference numeral 10, includes a tank 11 having a bottom 13 and walls 12 with bearings 14 secured thereto. Supported in bearing 14 and extending across tank 11 is shaft 20 having removable end frames 22, 24 thereon. Contactor media 30 consisting of two or more adjacent discs 32, 32a etc. as shown, is positioned on shaft 20 with the discs compressed into mating engagement between frames 22, 24. The media is, preferably, separated on shaft 20 by inner frames 28 into four foot wide media segments. The discs are identical, however, for the purpose of description herein, they are distinguishable by suffix letters. Wastewater is introduced into and treated water is withdrawn from tank 11 via ports, not shown. Shaft 20 and associated media 30 are rotated via a motor, also not shown.

Figure 3:
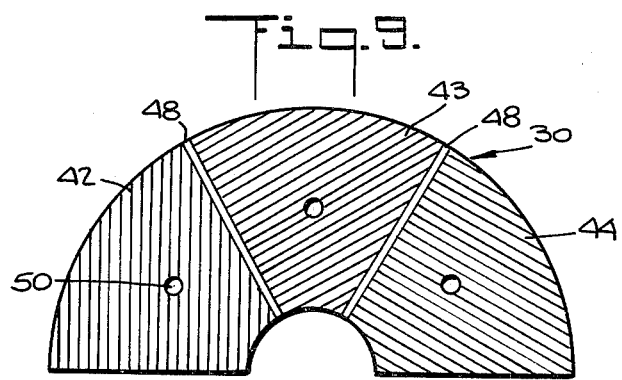
FIG. 3 is an exploded perspective view of two adjacent, unmated discs.
Figure 3:
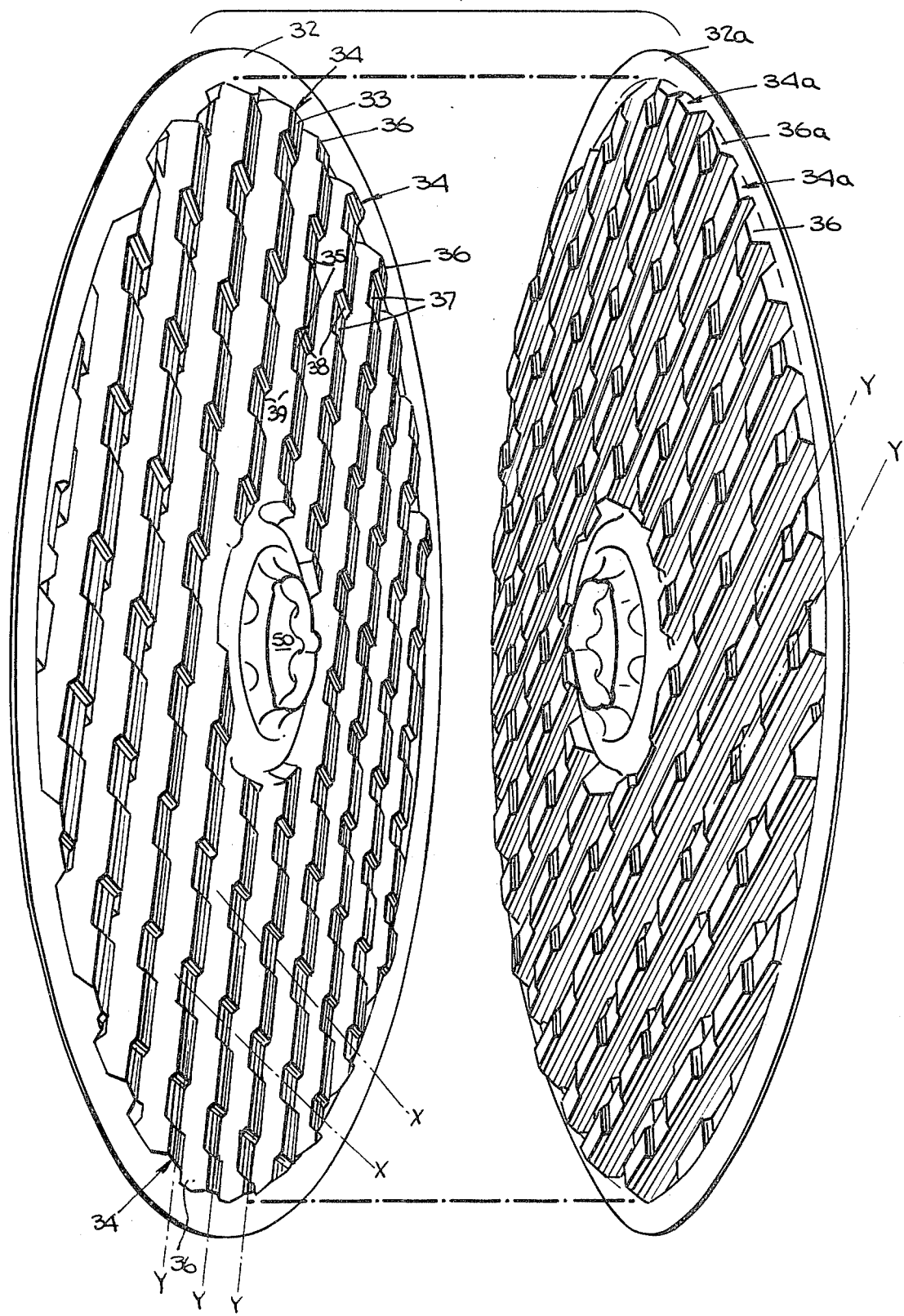

Referring to FIGS. 2 and 3, disc 32, which is representative of the discs, is a corrugated circular sheet having parallel raised ribs 34 separated by parallel inverted ribs 36. Ribs 34 and inverted ribs 36 are arranged in a single rib-single inverted rib pattern. Disc 32 includes circular center hole 50 which is adapted to receive the shaft. Typically, disc 32 has an overall thickness of 1 inch and a separation between longitudinal centerlines Y of two adjacent ribs or two adjacent inverted ribs of 2 inches. Disc 32 is made of substantially pure polyethylene material of high molecular weight.

Each rib 34 includes flat top or apex surface 33 which has a series of uniformly spaced apart recesses 35 and a pair of diverging surfaces 39 (shown in FIGS. 3 & 7). Each inverted rib 36 has a series of uniformly spaced apart abutments which form recesses 37 on the side of disc 32 opposite apex surface 33. Recesses 35 and 37 are of parallelogram shape having edges 38 disposed in an approximately sixty degree angle with longitudinal centerlines Y of ribs 34 and inverted ribs 36. Typically, recesses 35 and 37 are 1 inch long by $\frac{1}{2}$ inch wide and have a depth of $\frac{1}{8}$ inch. The separation between centerlines X of two adjacent recesses on a single rib or a single inverted rib is 2 inches.

In FIGS. 3 and 4, adjacent discs 32, 32a are positioned for mating. Centerlines Y of their respective ribs 34, 34a and respective inverted ribs 36, 36a are disposed at an angle to each other.

FIG. 5 shows the profile of single rib 34a and single inverted rib 36a of disc 32a. FIG. 6 shows in detail disc 32a mated with its adjacent discs 32 and 32b. Recesses 37 of inverted ribs 36 of disc 32 interfit with recesses 35a of ribs 34a of disc 32a, while recesses 37a of inverted ribs 36a of disc 32a interfit with recesses 35b of ribs 34b of disc 32b. This interfitting maintains the discs in alignment and reduces the center-to-center distance between two adjacent discs to $\frac{3}{4}$ inch.

Referring to FIGS. 6 and 7, the mating of the adjacent discs 32 and 32a results in the formation of crossing chordal channels 40, 42 through which waste water flows. It is on the water exposed surfaces of channels 40, 42 that microorganisms, such as slime, gradually grow. Consequently, the dimensional configuration of media 30, the mating of adjacent discs 32, 32a etc., and interfitting of their respective recesses 34, 34a etc., 36, 36a etc., provides channels 40, 42 with a larger water exposed surface area than heretofore possible and freedom from blockage by deposited waste thereon. In addition, the interlocking ribs-inverted ribs provide a surface geometry that enhances the transfer of oxygen from the atmosphere to the wastewater.

FIG. 8 shows another embodiment of media 30 wherein discs 32, 32a etc. are cut into semi-circular or 180° segments with holding pins 46 therethrough. Pins 46, which are removably securable in the frames of the water treatment apparatus, hold adjacent disc segments in their mated condition and prevent them from rotating with respect to one another.

FIG. 9 shows still another embodiment of media 30 wherein the semi-circular segment of FIG. 8 is reduced to three integral 60° or pie segments 42, 43 and 44 spaced apart via webs 48. Each pie segment has at least one but preferably three holes 50 adapted to receive the pipes. The holes are approximately 2 inches in diameter and have vacuum formed, rounded edges which prevent the application of high stress at the edges. To further strength media 30, each pie segment has the rib-inverted rib centerlines of its discs disposed in a different angular direction to the rib-inverted rib centerlines of the corresponding discs in each of the other two pie segments.

Although certain embodiments have been described and illustrated, modification may be made herein, as by adding, combining or subdividing parts or by substituting equivalents while retaining advantages and benefits of the invention, which itself is defined in the following claims.

I claim:

1. A contactor media for removing waste from water comprising:
   at least two mated discs, each disc having parallel raised ribs separated by parallel inverted ribs in an alternating pattern;
   each rib having a top surface with a series of uniformly spaced apart recesses therein; and,
   each inverted rib having a series of uniformly spaced apart recesses therein on the side of said disc opposite the top surface,
   whereby two mated discs have the recesses of the inverted ribs of one disc interfitting with the recesses of the ribs of the other disc, and whereby the two mated discs form crossing chordal channels which provide for the flow of waste water therein and the growth of microorganisms on the surfaces thereof and enhance the transfer of oxygen.

2. The media of claim 1 with at least three mated discs wherein, the recesses of the inverted ribs of the first disc interfit with the recesses of the ribs of the second disc, and the recesses of the ribs of the first disc interfit with the recesses of the inverted ribs of the third disc.

3. The media of claim 1 wherein, the recesses of said ribs and said inverted ribs are parallelogram shaped.

4. The media of claim 3 wherein, the recesses have edges disposed in a generally 60° angle with longitudinal centerline of said ribs and said inverted ribs.

5. A contactor media for treating wastewater in a tank and rotatably about a shaft in said tank, said media comprising:
   at least two mated discs, each disc having parallel raised ribs separated by parallel inverted ribs in an alternating rib-inverted rib pattern;
   means for rotating the matched discs about the shaft;
   each rib having a top surface with a series of uniformly spaced apart recesses therein; and,
   each inverted rib having a series of uniformly spaced apart recesses therein on the side of said disc opposite the top surface,
   whereby two mated discs have the recesses of the inverted ribs of one disc interfitting with the recesses of the ribs of the other disc, and whereby the two mated discs form crossing chordal channels which provide for the flow of waste water therein and the growth of microorganisms on the surfaces thereof as the discs rotate about the shaft.

6. The media of claim 5 with at least three mated discs wherein, the recesses of the inverted ribs of the first disc interfit with the recesses of the ribs of the second disc, and the recesses of the ribs of the first disc interfit with the recesses of the inverted ribs of the third disc.

7. The media of claim 5 wherein, the recesses of said ribs and said inverted ribs are parallelogram shaped.

8. The media of claim 7 wherein, the recesses have edges disposed in a generally 60° angle with longitudinal centerline of said ribs and said inverted ribs.

* * * * *